UNITED STATES PATENT OFFICE.

WILLIAM P. KOOKOGEY, OF NEW YORK, N. Y.

GALVANIC-BATTERY SOLUTION.

SPECIFICATION forming part of Letters Patent No. 360,024, dated March 29, 1887.

Application filed December 8, 1885. Serial No. 185,049. (No specimens.)

*To all whom it may concern:*

Be it known that I, WILLIAM P. KOOKOGEY, a citizen of the United States, and a resident of New York, in the county of New York and State of New York, have invented certain new and useful Galvanic-Battery Solutions, of which the following is a specification.

My invention is an improved solution for primary galvanic batteries, made under a new process, by which I am enabled to liberate the base from the bichromate salt and hold the chromic acid in solution.

Heretofore bichromate battery solutions have been made by dissolving bichromate of potash in sulphuric acid and water. By this process the bichromate of potash is completely dissolved in the water and sulphuric acid, generally to the point of saturation. As the base (as well as the chromium and part of the salt desired) is held in solution by the formula now in use for making bichromate solution, the solution thus made possesses many objections, among which is the formation of chrome-alum or chromic alum on the elements of the battery, which, besides increasing the internal resistance of the battery, disintegrates and otherwise injures the elements and efficiency of the battery, and frequently the jar also. In my solution I entirely overcome this objection by removing, in the form of crystals, the base of the bichromate salt, leaving the chromium in the solution.

The formula for making my solution is substantially the following: I add to a certain proportion of bichromate of potash or bichromate of lime boiling water, or bring the water to the boiling-point after adding it to the salt, and while the mixture is still at or near the boiling-point I add sulphuric acid, substantially in the proportions hereinafter stated.

The proportion of bichromate of potash or bichromate of lime I use in making my solution is proportionate to the strength I wish the solution to be and the amount of chromic acid I wish it to contain. The formula which I generally use, however, and which I recommend as being the best, is the following: Add to eight ounces of bichromate of potash or nine ounces of bichromate of lime two and a half pounds of boiling water. I then add three and a half pounds (avoirdupois) of sulphuric acid, (of the specific gravity of about 1835.) If stronger or weaker acid is used, a little larger or smaller proportion of acid may be used, proportionate to the difference in specific gravity from that above stated. The solution thus made is allowed to cool, and to remain for about twenty-four hours (more or less) at a temperature of from 60° to 68° Fahrenheit. The liquid is then siphoned off, when it will be found that the base or the sulphate of the base is wholly dissolved into its natural crystals, and is deposited in the bottom of the vessel. The solution thus made and siphoned off is then ready for use.

While, as I stated above, I recommend the above proportions and observance of the rules and formula for making my solution, still it must be apparent to any one familiar with the subject that these proportions may be slightly changed without serious damage being done.

What I claim is—

The herein-described method of producing a battery-solution, which consists in dissolving bichromate of potash or bichromate of lime in hot water, adding to the mixture sulphuric acid, then permitting the preparation to cool and stand, during which time the sulphate salt is crystallized and precipitated, then decanting the liquid from the precipitate, the materials being combined in substantially the proportions stated.

Signed at New York, in the county of New York and State of New York, this 24th day of November, A. D, 1885.

WM. P. KOOKOGEY.

Witnesses:
W. J. TOWNSEND,
EDWIN H. BROWN.